United States Patent [19]

Watanabe et al.

[11] Patent Number: 5,103,345
[45] Date of Patent: Apr. 7, 1992

[54] OPTICAL HEAD

[75] Inventors: Osamu Watanabe, Musashino; Suguru Takishima, Hoya, both of Japan

[73] Assignee: Asahi Kogaku Kogyo Kabushiki Kaisha, Tokyo, Japan

[21] Appl. No.: 588,037

[22] Filed: Sep. 25, 1990

[30] Foreign Application Priority Data

Sep. 26, 1989 [JP] Japan .............................. 1-112921[U]

[51] Int. Cl.$^5$ .............................................. G02B 7/02
[52] U.S. Cl. .................................... 359/813; 359/823; 369/44.16
[58] Field of Search .............. 350/245, 247, 252, 255; 369/44.15, 44.16, 43, 52; 250/201.5

[56] References Cited

U.S. PATENT DOCUMENTS 4,799,766 1/1989 Estes .................................. 359/819
4,835,646 5/1989 Kurosawa et al. .
4,868,377 9/1989 Nishikawa .

FOREIGN PATENT DOCUMENTS 62-162241 7/1987 Japan .
63-214925 9/1988 Japan .

OTHER PUBLICATIONS

English Language Abstract of Japanese 62-162241.
English Language Abstract of Japanese 63-214925.

Primary Examiner—Loha Ben
Attorney, Agent, or Firm—Sandler, Greenblum & Bernstein

[57] ABSTRACT

In a reflecting plate provided on an optical head arranged to be movable at least in a predetermined direction within a device such as a compact-disk player and the like, a multiplicity of irregularities are formed on a surface of the reflecting plate for causing diffused reflection of light. Then, since the light is diffusely reflected at the edge portions of the reflecting plate in the predetermined direction, an area, in which a linear relation exists between movement of the optical head and the output level of an amplifier signal in accordance with the movement can be wider as compared with the case in which these irregularities are not formed.

9 Claims, 7 Drawing Sheets

OPTICAL HEAD

BACKGROUND OF THE INVENTION

This invention relates to an optical head which can be employed in an optical disk device, an optical videodisk device, a compact-disk player and so on.

Figure 1:
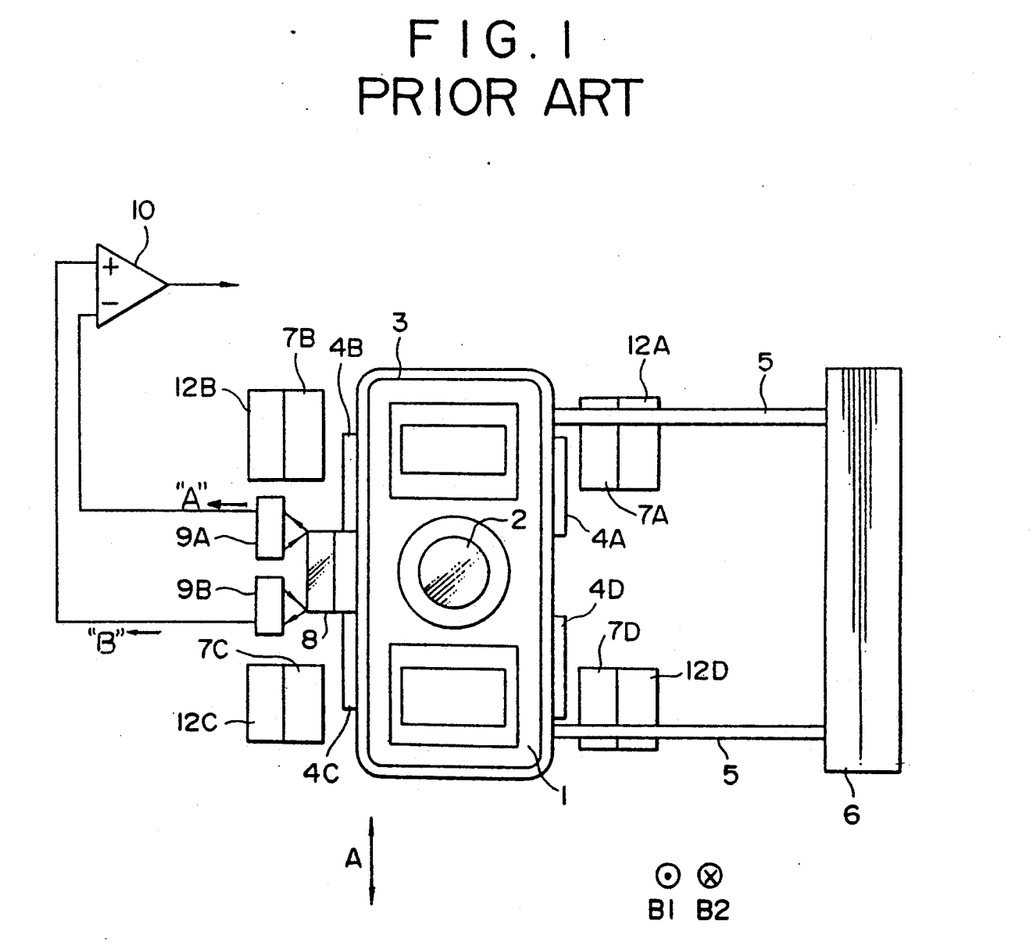
FIG. 1 is a plane view of a conventional optical head.

FIG. 1 shows a plane view showing a construction of a conventional optical head which is employable in an optical disk device. In the drawing, numeral 1 indicates a bobbin serving as a lens holder constructed to mount an objective lens 2 thereon. The bobbin 1 is arranged to the movable along a direction indicated by an arrow "A" as well as a direction indicated by a pair of symbols "B1" and "B2" which is orthogonal to the "A" direction, i.e., perpendicular to a surface of a sheet on which the drawing is shown. A focusing coil 3 is wound around the outer surface of the bobbin 1, and tracking coils 4A through 4D are mounted on the focusing coil 3. Further, numerals 5, 5 indicate a wire suspension mechanism for supporting the bobbin 1. One pair of terminals of the wire suspension mechanism 5 is connected to an outer surface of the bobbin 1, while the other pair of terminals thereof is connected to a fixing member 6 which is fixed within a device in which the optical head to be provided. Therefore, the bobbin 1 is supported by the suspension mechanism 5 and is moved in the "A" direction as well as "B1-B2" direction in accordance with deformation of wires comprising the wire suspension mechanism 5.

Numerals 7A through 7D respectively indicate permanent magnets mounted on fixing members 12A through 12D for generating a magnetic field. Thus, the focusing coil 3 and the tracking coils 4A through 4D are located in the magnetic field generated by the permanent magnets 7A through 7D. Numeral 8 indicates a reflecting plate for reflecting light transmitted from light transmitting elements included in a pair of optical sensors 9A and 9B, described later. The reflecting plate 8 is mounted on the bobbin 1, as shown on FIG. 1, the opposite side surface with respect to the surface on which the suspension mechanism 5 is connected as shown in FIG. 1. The reflecting plate 8 is arranged, for example, such that the surface of a metal, glass and so forth ground in advance, is evaporated by a thin metal membrane. Further, a pair of optical sensors 9A and 9B are provided opposite to the reflecting plate 8. A differential operational amplifier 10 is provided for outputting signal in accordance with the difference between the outputs of the optical sensors 9A and 9B.

Figure 2:
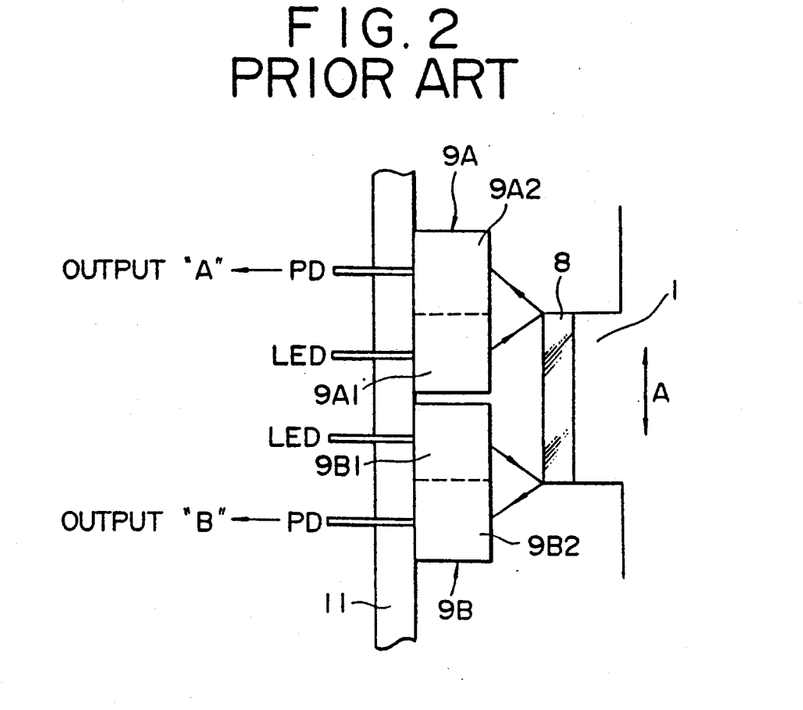
FIG. 2 is a partial enlarged view of FIG. 1 showing a position at which a pair of optical sensors and the optical head FIG. 1 are opposed with each other.

As shown in FIG. 2, showing a partial enlarged view of the FIG. 1, the pair of optical sensors 9A and 9B respectively include light transmitting elements 9A1 and 9B1, such as LEDs (Light Emitting Diodes), and light receiving elements 9A2 and 9B2, such as PDs (Photo Diodes). The light transmitted from the light transmitting elements 9A1 and 9B1 respectively illuminate edge portions of the reflecting plate 8 as shown in FIG. 2.

In the above structured conventional optical head, when a signal caused by a moving error of the optical head along a focusing direction, i.e., "B1-B2" direction, is supplied to the focusing coil 3, a moving force is generated along the "B1-B2" direction, in accord with Fleming's left hand rule, since the focusing coil 3 is located in the magnetic field generated by the permanent magnets 7A through 7D. Accordingly, the wires of the suspension mechanism 5 are deformed, and then, the optical head can be moved along the "B1-B2" direction. On the other hand, when a signal caused by the moving error of the optical head along a tracking direction, i.e., "A" direction, is supplied to the tracking coils 4A through 4D, moving force is generated along the "A" direction in accord with Fleming's left hand rule, and then, the optical head can be moved along the "A" direction. When the optical head is moved upwardly in the drawing of FIG. 2, an amount of the light reflected by the reflecting plate 8 transmitted from the light transmitting element 9A1 is increased. Therefore, the amount of light received by the light receiving element 9A2 is increased. In this case, the amount of light received by the light receiving element 9B2 is decreased. On the contrary, when the optical head is moved downwardly in the drawing, the amount of light received by the light receiving element 9B2 is increased, and the amount of light received by the light receiving element 9A2 is decreased. Accordingly, by detecting the difference between the outputs "A" "B" of these light receiving elements, which corresponds to the amount of received light, it becomes possible to determine the position of the optical head along the "A" direction, i.e., the tracking direction.

Figure 3:
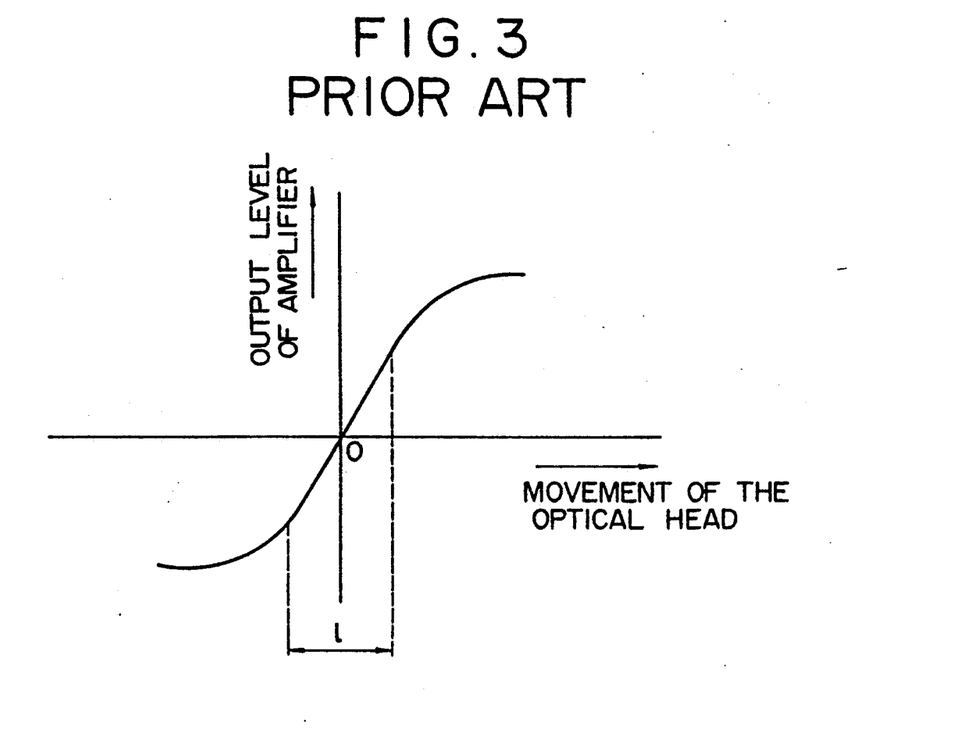
FIG. 3 is a view showing an output level characteristic of an amplifier arranged to output a signal in accordance with movement of the optical head of FIG. 1 along a tracking direction.

In the above conventional optical head, since the surface of the reflecting plate 8 is arranged to be evaporated by thin metal membrane on a surface of a metal, glass and so forth having been ground in advance, the cost for obtaining the above structured reflecting plate 8 is increased. Further, since a surface of the reflecting plate 8 is specularly arranged for effectively reflecting light, as illustrated in FIG. 3, an area "1", in which linearity between movement of the optical head along the tracking direction, and the output level of the differential operational amplifier 10, is substantially satisfied, can not be increased. Furthermore, the output level of the differential operational amplifier 10 is undesirably varied, if a crack, chipped portion and so forth exists at the edge portions of the reflecting plate 8.

SUMMARY OF THE INVENTION

It is therefore an object of the invention to provide an improved optical head arranged in such a manner that the cost thereof is not increased, and further, an area, in which linearity between an amount of movement thereof along the tracking direction and the output level of the differential operational amplifier is substantially satisfied, can be increased.

For this purpose, according to the present invention, there is provided a position detecting mechanism, adapted to be positioned in a device having a predetermined member arranged to be movable at least in one direction, for detecting the position of the predetermined member in the direction.

The mechanism includes a pair of light transmitting members for transmitting light toward the predetermined member, a reflecting mechanism, provided on the predetermined member, extending along the one direction for a predetermined length, for reflecting light transmitted from the pair of light transmitting members at the edge portions thereof, along the one direction, a surface of the reflecting mechanism being arranged to caused diffused reflection, and a pair of light receiving members for receiving light reflected by the reflecting mechanism and outputting signals corresponding to the amounts of light received by the light receiving members, whereby the amounts of light received by the pair of light receiving members are varied in accordance with movement of the predetermined member in the one direction, and the position thereof in the one direction is detected based upon the signals outputted from the pair of light receiving members.

DESCRIPTION OF THE EMBODIMENTS

Figure 4:
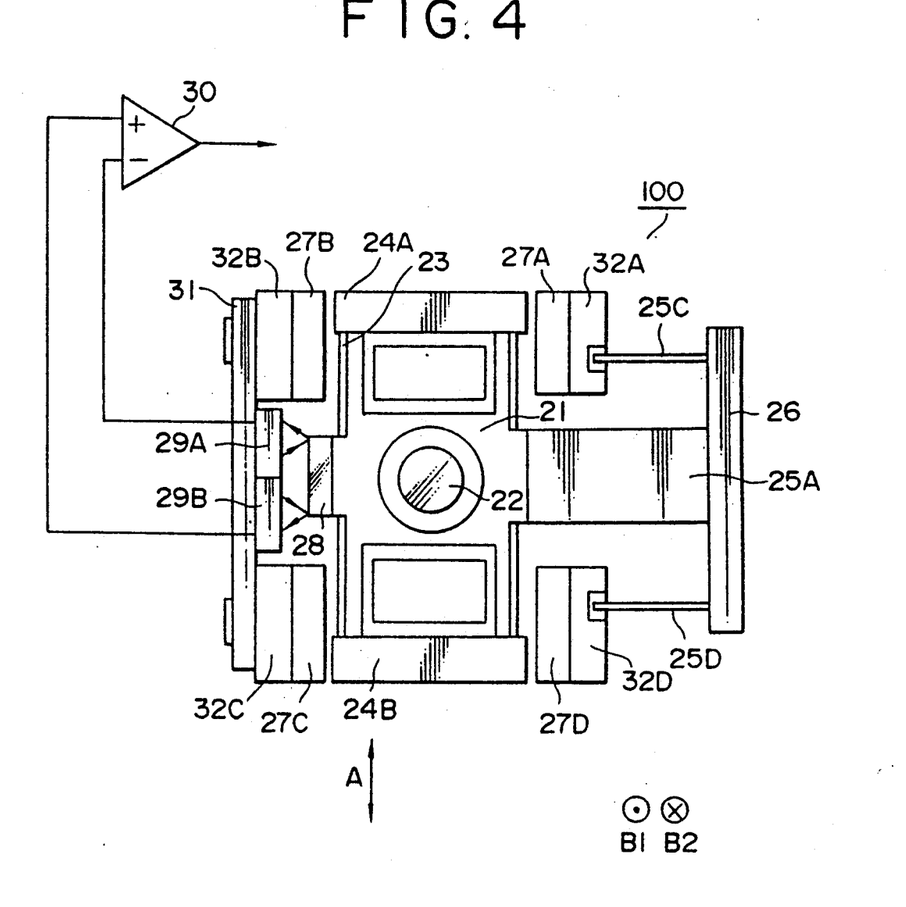
FIG. 4 is a plane view of an optical head according to the present invention.
Figure 5:
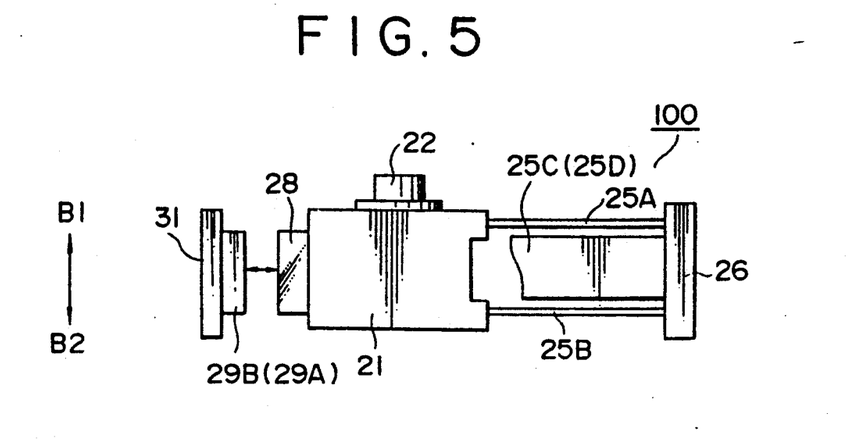
FIG. 5 is a side view of the optical head of FIG. 4.

FIG. 4 shows a plane view of an optical head 100 according to the present invention, and FIG. 5 is a side view of the optical head 100 of FIG. 4. In these drawings, a bobbin 21 is constructed to mount on objective lens 22 thereon. A focusing coil 23 is wound around an outer surface of the bobbin 21 and numerals 24A and 24B indicate tracking coils mounted on the focusing coil 23.

Numerals 25A and 25B indicate a pair of leaf springs whose one edge portions are respectively connected to an outer surface of the bobbin 21 and the other edge portions thereof are affixed to a movable support member 26. Member 26 is movable only in the tracking direction "A". Accordingly, leaf springs 25A and 25B can be deformed in a direction indicated by the symbols "B1" and "B2" about the support member 26, i.e., in a direction perpendicular to a surface of a sheet on which the drawing is shown. Numerals 25C and 25D indicate another pair of leaf springs whose one edge portions are affixed to the movable support member 26 in the same manner as that of leaf springs 25A and 25B, and the other edge portions thereof are respectively connected to fixing members 32A and 32B, fixably provided within the device. Accordingly, leaf springs 25C and 25D are arranged to be deformed in a direction indicated by arrow "A".

Numerals 27A through 27D respectively, indicate permanent magnets mounted on the fixing members 32A through 32D, for generating a magnetic field. In other words, the focusing coil 23 and tracking coils 24A and 24B are located within the magnetic field generated by the permanent magnets 27A through 27D. Further a reflecting plate 28, is provided for reflecting light transmitted from light transmitting elements included in a pair of optical sensors 29A and 29B, described later. The reflecting plate 28 is mounted on the bobbin 21, as shown on FIG. 4, in the opposite side surface with respect to the surface on which the leaf springs 25A through 25D are connected. The reflecting plate 28 comprises, for example, a synthetic resin such as plastic, on which a multiplicity of irregularities are formed by means of a predetermined method such as a so-called closed die fogging method for causing diffused reflection of the reflected light. Therefore, the incident light on the surface of the reflecting plate 28 is diffused irrespective the incident direction thereof, and then, the area where the reflected light reaches is widened as compared with the case in which the light is not diffused. Further, a pair of optical sensors 29A and 29B are positioned opposite to the reflecting plate 28. A differential operational amplifier 30 is provided for outputting a signal in accordance with the difference between the outputs of the optical sensors 29A and 29B.

Figure 6:
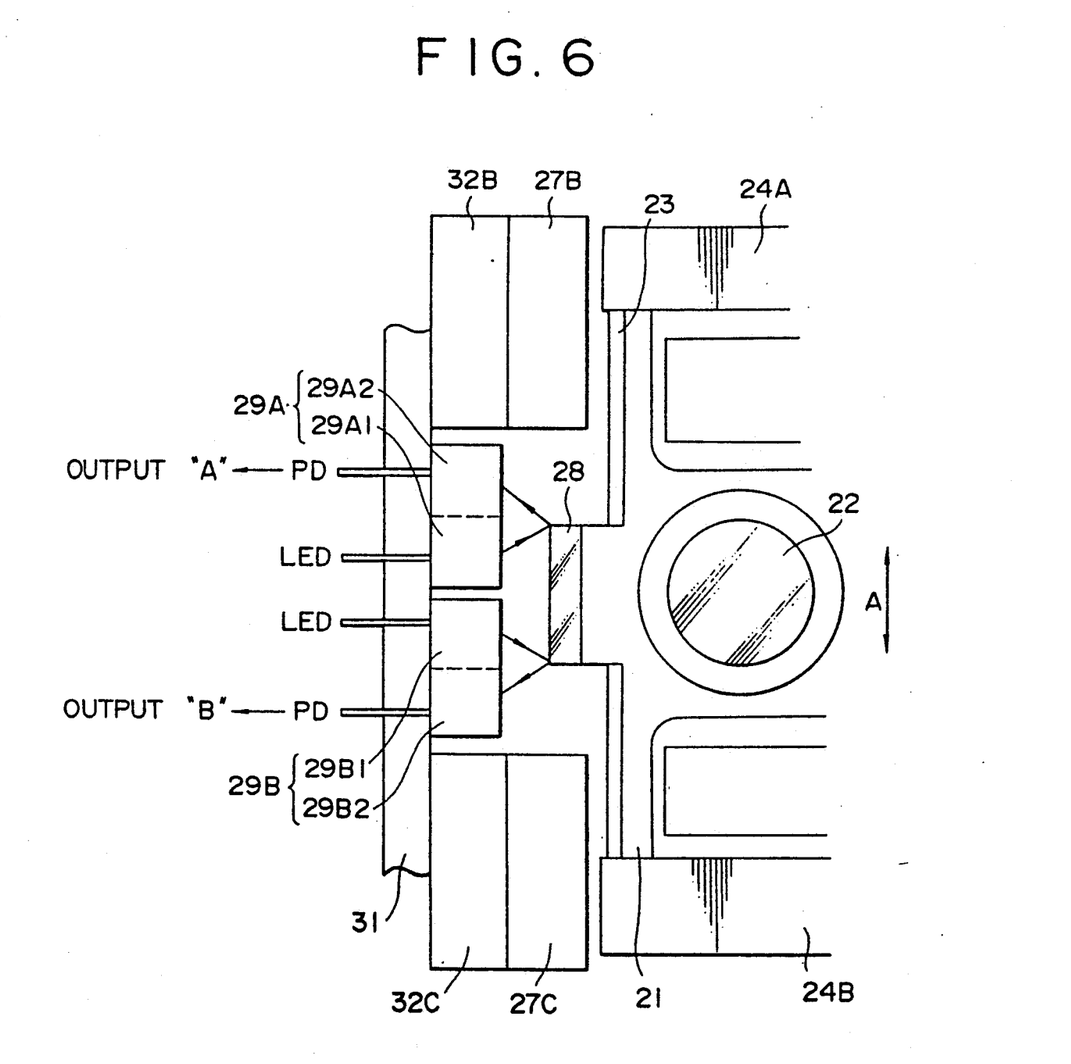
FIG. 6 is a partial enlarged view of FIG. 4 showing a portion at which a pair of optical sensors are mounted.

As illustrated in FIG. 6 showing a partial enlarged view of the FIG. 4, the pair of optical sensors 29A and 29B are mounted on a fixing section 31 which is fixed in the device, and respectively include light transmitting elements 29A1 and 29B1 such as LEDs (Light Emitting Diodes) and light receiving elements 29A2 and 29B2 such as PDs (Photo Diodes). The light transmitted frof the light transmitting elements 29A1 and 29B1 respectively, illuminate edge portions of the reflecting plate 28 as shown in FIG. 6.

In the above structured optical head 100 according to the present invention, when a signal caused by a moving error of the optical head 100 along a focusing direction, i.e., "B1-B2" direction, is supplied to the focusing coil 23 by means of a well-known driving system, not shown, a moving force is generated along the "B1-B2" direction in accord with Fleming's left hand rule, since the focusing coil 23 is located in the magnetic field generated by the permanent magnets 7A and 7B. Accordingly, the leaf springs 25A and 25B are deformed, and then, the optical head 100 can be moved along the "B1-B2" direction. On the other hand, when a signal caused by the moving error of the optical head 100 along a tracking direction, i.e., "A" direction, is supplied to the tracking coil 24A and 24B, a moving force is generated along the "A" direction in accord with Fleming's left hand rule, and then, the optical head 100 can be moved along the "A" direction. When the optical head 100 is moved upwardly in the drawing of FIG. 4, the amount of light reflected by the reflected plate 28, transmitted from the light transmitting element 29A1, is increased. Thus, the an amount of the light to be received by the light receiving element 29A2 is increased. In this case, an amount of light received by the light receiving element 29B2 is decreased. On the contrary, when the optical head 100 is moved downwardly in the drawing, the amount of light received by the light receiving element 29B2 is increased, and the amount of light received by the light receiving element 29A2 is decreased. Accordingly, by detecting the difference between the outputs "A" and "B", which are respectively outputted from these light receiving elements 29A2 and 29B2, and respectively correspond to the amounts of the received light, it becomes possible to determine a position of the optical head 100 in the "A" direction, i.e., the tracking direction. Further, it becomes possible to control the position of the optical head 100 along the tracking direction by means of the output signal of the differential operational amplifier 30 which is arranged, as described above, to output the signal in accordance with the difference between the outputs from the optical sensors 29A and 29B.

Figure 7:
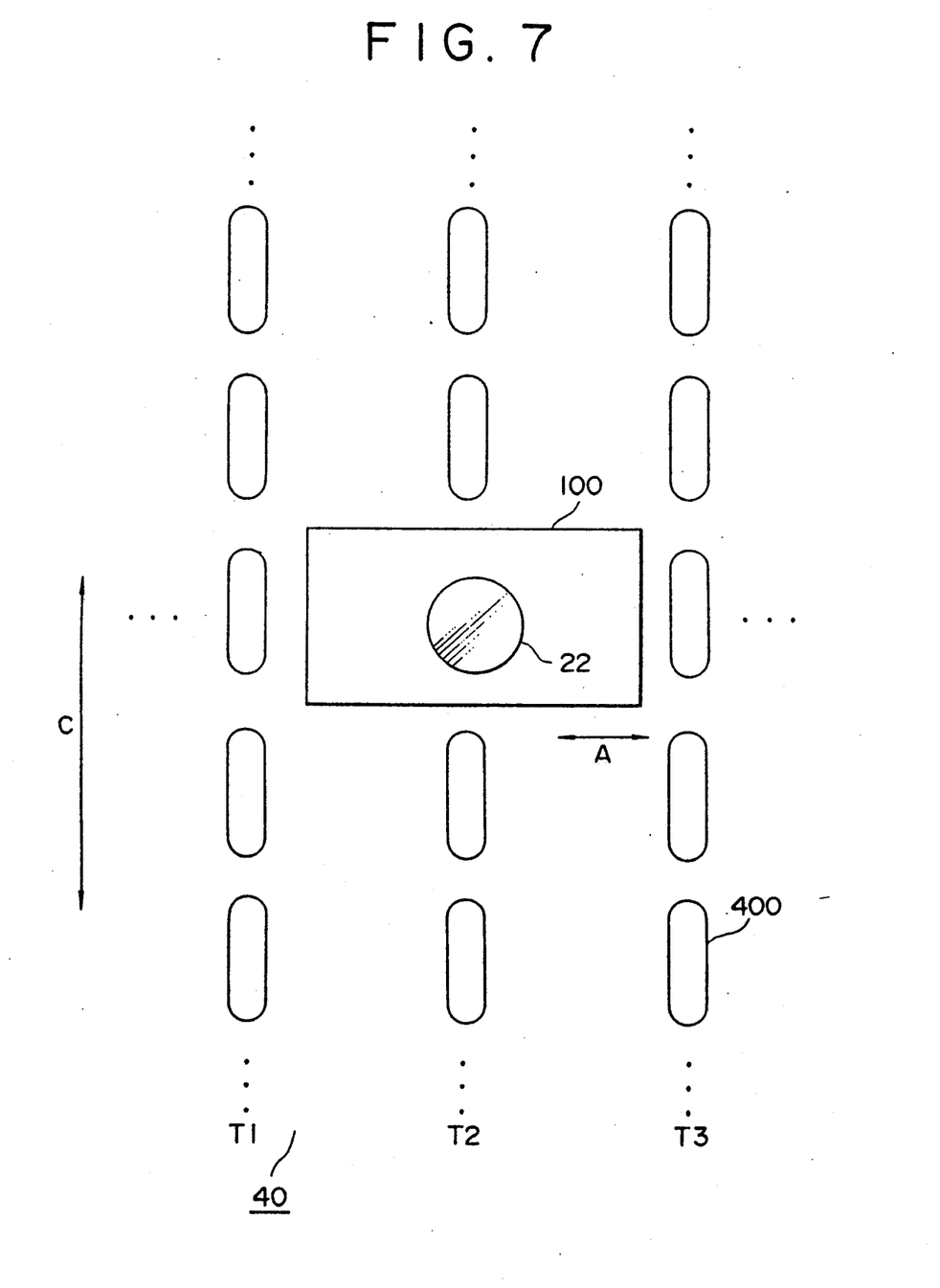
FIG. 7 is a view showing a positional relationship between the optical head according to the present invention and a recording medium for storing data to be read by the optical head.

By employing the above constructed optical head 100 in the device such as an optical video-disk device, a compact disk device and so forth, light emitted from an light source, not shown, is passed through the objective lens 22, and data are read out from a predetermined recording medium such as a compact disk in accordance with the light. Further, as shown in FIG. 7, a recording medium 40 such as a disk, on which a plurality of tracks, for example T1-T3 are arranged, each comprising a multiplicity of pits 400 respectively corresponding to the stored data is provided. The disk is located below the optical head 100 and moved relatively to the optical head 100 along a direction indicated by an arrow "C" by means of a predetermined driving source, not shown. In other words, the optical head 100 traces the desired track as the disk 40 is moved, and the data corresponding to the pits along the desired track as the disk 40 is moved. During the above tracing operation, the optical head is located at the desired position in the tracking direction, i.e., "A" direction by means of the above described process. In other words, the optical head is controlled so as to be located at the desired position even if it is undesirably moved in the "A" direction.

When a carriage, not shown, for mounting the optical head 100 is moved in a radial direction of the disk 40, i.e., the tracking direction, at high speed, an undesirable deviation of the optical head from the desired position may be caused so-called inertia. In other words, when the carriage is moved to a certain position in the radial direction of the disk 40 at high speed, the optical head 100 on the carriage is undesirably moved in the radial direction by the inertia thereof. This means that a relatively long time interval is required before the optical head 100 is completely located at the desired position. In order to solve the above problem, the amount and direction of the deviation of the optical head 100 are optically detected, and the optical head 100 is controlled so as in be moved to the opposite direction in the radial direction by means of moving force generated by reversed phase current flowing through the tracking coils 24A and 24B. In other words, the outputs "A" and "B", based upon the above deviation are respectively inputted to the differential operational amplifier 30, and the differential operational amplifier 30 outputs a signal in accordance with the input signals; and then, a reversed phase current flows through the tracking coil 24A and 24B. Therefore, it becomes possible to control the optical head 100 so as in be driven to the opposite direction, in accordance with the output signal of the differential operational amplifier 30.

Figure 8:
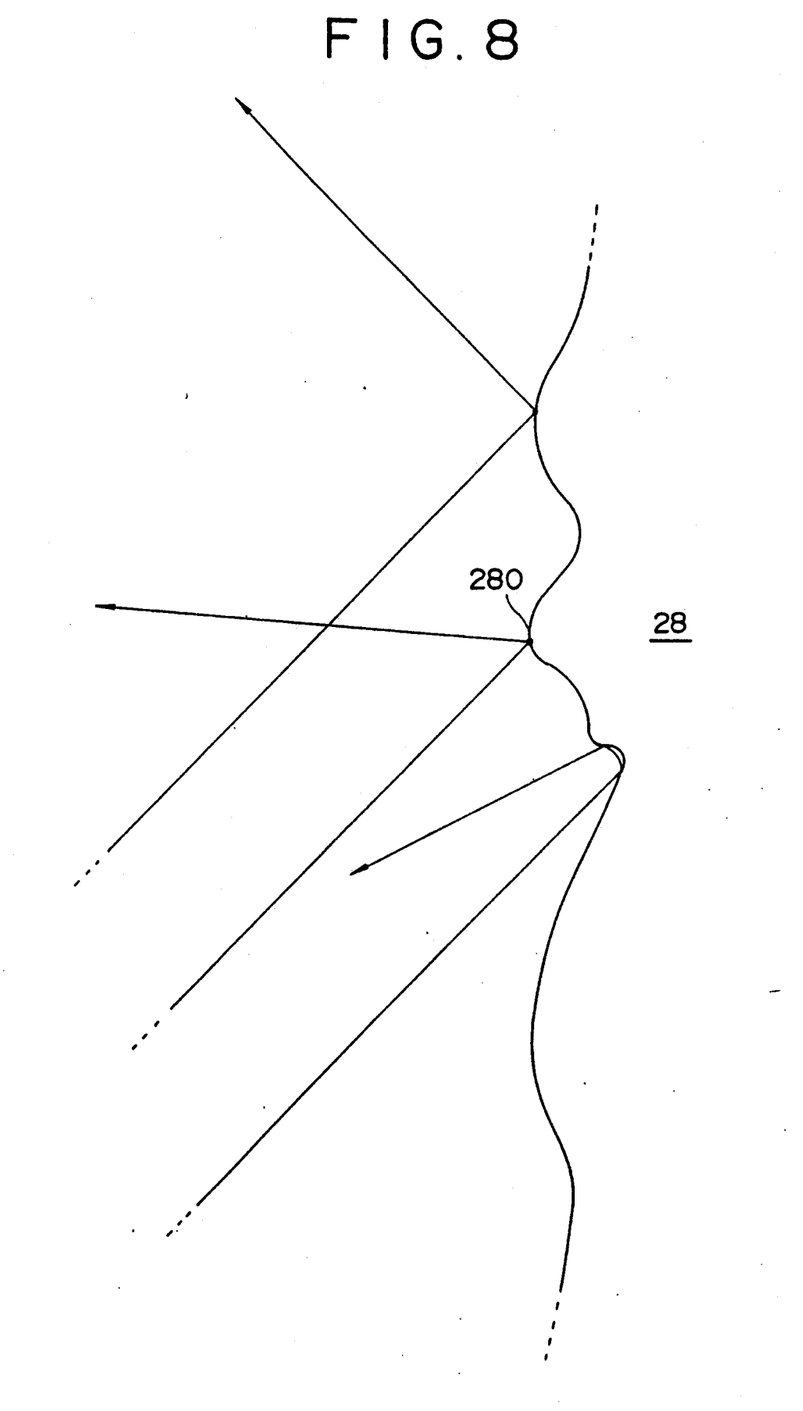
FIG. 8 is an enlarged view showing a surface of a reflecting plate arranged to be mounted on the optical head according to the present invention.
Figure 9:
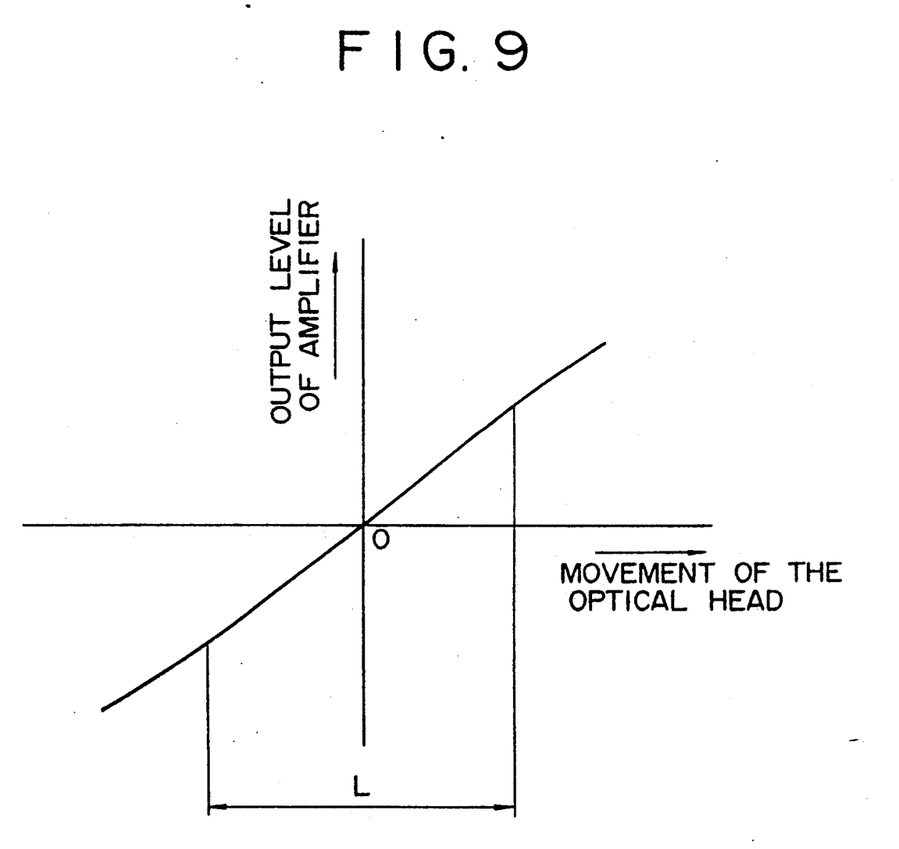
FIG. 9 is a view showing an output level characteristic of the amplifiers output signal in accordance with movement of the optical head of FIG. 4 along a tracking direction.

Referring to FIG. A, mentioned above, on the surface of the reflecting plate 28 irregularities 280 are formed to cause diffused reflection of the reflected light. Accordingly, the light transmitted from the light transmitted elements 29A1 and 29B1 are respectively diffused as shown by arrows in the drawing. Consequently, an area in which the light reaches or covers becomes wider, as compared with the case in which the diffused reflection is not present, i.e., where the irregularities are not formed. Therefore, the output level of the differential operational amplifier 30 is not undesirably varied even if a crack, chipped portion and so forth exists at the edge portions of the reflecting plate 28. Further, since the light is diffused at the reflecting plate 28, an area "L" in FIG. 9, in which linearity between the movement of the optical head 100 along the tracking direction and the output level of the differential amplifier 30 is substantially satisfied, becomes wider as compared with the case the diffused reflection is not present. Furthermore, since the irregularities are formed on a synthetic resin such as plastic, the cost for obtaining the reflecting plate 28 can be decreased.

As described above, since the irregularities are formed on a surface of the reflecting plate for causing diffused reflection of the reflected light, an area in which the light reaches becomes wider as compared with the case in which the diffused reflection is not present, i.e., the irregularities are not formed. Therefore, the output level of the differential operational amplifier is not undesirably varied even if a crack, chipped portion and so forth exists at the edge portions of the reflecting plate. Further, since the light is diffused at the reflecting plate, an area, in which a linear relation exists between the movement of the optical head and the output level, of the amplifier in accordance with the movement, becomes wider as compared with the case the diffused reflection is not present. Furthermore, since the irregularities are formed on a synthetic resin such as platic, cost for obtaining the reflecting plate can be decreased.

What is claimed is:

1. A position detecting mechanism, adapted to be positioned in a device having a predetermined member arranged to be movable at least in one direction, for detecting the position of said predetermined member in said direction, comprising:
  a pair of light transmitting means for transmitting light towards said predetermined member;
  reflecting means, provided on said predetermined member, extending along said direction for a predetermined length, for reflecting the light transmitted from said pair of light transmitting means at the edge portions of said light transmitting means along said direction, a surface of said light reflecting means comprising means for causing diffused reflection of light; and
  a pair of light receiving means for receiving the light reflected by said reflecting means and outputting signals corresponding to the amounts of light received by said light receiving means, whereby the amounts of light received by said pair of light receiving means are varied in accordance with movement of said predetermined member in said direction, and the position of said predetermined member in said direction is detected in response to the signals outputted from said pair of light receiving means.

2. The mechanism according to claim 1, wherein a multiplicity of irregularities are formed on said surface of said reflecting means in a predetermined manner so that light reaching said light receiving means is diffusely reflected.

3. The mechanism according to claim 1, wherein said pair of light transmitting means comprise light emitting diodes and said pair of light receiving means comprise photo diodes.

4. The mechanism according to claim 1, which further comprises performing means for calculating a subtraction between the amounts of light respectively received by each of said pair of light receiving means.

5. The mechanism according to claim 4, wherein said calculating means comprises a differential operational amplifier having input signals respectively corresponding to said amounts of light received by each of said light receiving means and to output a signal corresponding to the difference between said amounts of light.

6. A position controlling mechanism, adapted to be positioned in a device having an optical head arranged to be movable at least in one direction, for detecting the position of said optical head in said direction, comprising:

a pair of light transmitting means for transmitting light towards said optical head;

reflecting means, provided on said optical head, extending along said direction for a predetermined length, for reflecting the light transmitted from said pair of light transmitting means at the edge portions of said reflecting means along said direction, a surface of said reflecting means comprising means for causing diffused reflection of light;

a pair of light receiving means, for receiving the light reflected by said reflecting means and outputting signals corresponding to amounts of light received by said light receiving means, whereby the amounts of light received by said pair of light receiving means are varied in accordance with movement of the optical head in said direction, and the position of said optical head in said direction is detected in response to the signals outputted from said pair of light receiving means; and calculating means for performing a substraction between the amounts of light received by each of said pair of light receiving means.

7. The mechanism according to claim 6, wherein a multiplicity of irregularities are formed on said surface of said reflecting means in a predetermined manner so that the light reaching said light receiving means is diffusely reflected.

8. The mechanism according to claim 6, wherein said pair of light transmitting means comprise light emitting diodes and said pair of light receiving means comprise photo diodes.

9. A position detecting mechanism for detecting the position of a movable member with respect to an apparatus with respect to which the movable member is adapted to be moved, said movable member being adapted to be movable in a predetermined direction, said position detecting mechanism comprising:

a pair of light emitting means mounted on a selected one of the movable member and the apparatus;

reflecting means mounted on the other of the movable member and the apparatus, said reflecting means having a light reflecting surface, said light reflecting surface of said reflecting means comprising a surface finished to cause diffused reflection of light, the light emitted by said pair of light emitting means being reflected by said light reflecting surface; and a pair of light receiving means mounted on said one of the movable member and the apparatus for receiving the light emitted by said pair of light emitting means and reflected by said light reflecting surface, and for outputting optical signals corresponding to the amount of received light, whereby the position of the movable member with respect to the apparatus is detected, in response to said signals outputted by said pair of light receiving means.

* * * * *